3,287,373
PROCESS FOR PREPARING BENZOPHENONE ACIDS AND ANHYDRIDES AND ANHYDRIDES RESULTING THEREFROM
John H. McCracken, Pitcairn, and Johann G. D. Schulz and Arthur C. Whitaker, Pittsburgh, Pa., assignors to Gulf Research & Development Company, Pittsburgh, Pa., a corporation of Delaware
No Drawing. Filed Dec. 10, 1963, Ser. No. 329,394
6 Claims. (Cl. 260—346.3)

This invention relates to new dimeric benzophenonetricarboxylic trianhydrides, new compounds intermediate thereto and new processes for preparing the same.

The first step in the process of preparing the new and ultimately desirable compounds involves oxidation of 3,4,3',4'-tetramethylbenzophenone in the presence of an oxidation catalyst, such as chromium trioxide, potassium permanganate, oxygen, etc. in a solvent, such as water and/or acetic acid, at a temperature of about 50° to about 150° C. and a pressure of about 0 to about 100 pounds per square inch gauge for about 0.1 to about 10 hours. The mixture of triacids produced can be recovered from the reaction mixture in any convenient manner. Thus the reaction mixture can be cooled to room temperature, diluted with water and filtered. The solid material obtained comprises unreacted 3,4,3',4'-tetramethylbenzophenone and the mono-, di- and tri-acids thereof. The solid material is then extracted with an alkaline reagent, such as sodium hydroxide, thereby taking into solution the mono-, di- and tri-acids of 3,4,3',4'-tetramethylbenzophenone in the form of their sodium salts. The extract can then be treated with an acid, such as hydrochloric acid, to obtain the corresponding acids of said salts. To recover the triacids from the extract, the latter is extracted with water at a temperature of about 60° to about 150° C. The water extract can then be heated to drive off the water, leaving behind a mixture of triacids, hereinafter defined as "Compounds A and B," respectively, benzophenone 4-methyl, 3,3',4'-tricarboxylic acid and benzophenone 3-methyl, 4,3',4'-tricarboxylic acid, having the following structural formula:

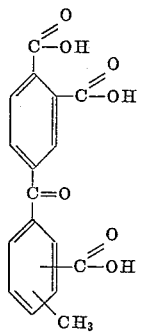

In the above structural formula we are certain that on one of the rings the carboxylic acid groups are in the 3- and 4-position. In the second ring we are also certain that the two substituents are in the 3' and 4' position, since the substituents on the charge were similarly located. However, since we believe that the methyl substituents are equally oxidizable to carboxylic acid groups, we believe that compounds are obtained wherein in one case the carboxylic acid group is in the 3'-position and in the other the carboxylic acid group is in the 4'-position. In each instance, however, the unreacted methyl substituent will be in the remaining position.

The corresponding monoanhydrides are obtained by merely heating Compounds A and B defined above at a temperature of about 150° to about 250° C. and a pressure of about 10 to about 760 mm. of mercury absolute for about 0.5 to about 24 hours. As a result of this, water is removed from Compounds A and B and a mixture of monohydrides, hereinafter defined as "Compounds C and D," respectively, benzophenone 4-methyl, 3,3',4'-tricarboxylic anhydride and benzophenone 3-methyl, 4,3',4'-tricarboxylic anhydride, having the following structural formula is obtained:

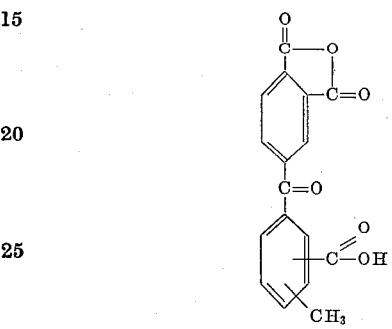

Again, the carboxylic acid and methyl substituents are located in one or the other of the 3'- and 4'-positions.

In the next step the sole acid function on one of the ring of Compounds C and D above is converted, desirably, as will be apparent below, to a mixed anhydride function, by reaction with approximately a molar equivalent of acetic anhydride at a temperature of about 140° to about 200° C. at about 0 to about 50 pounds per square inch gauge for about 0.5 to about five hours. The reaction proceeds as follows:

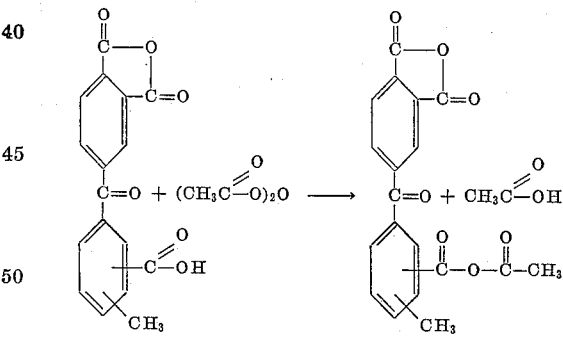

As before, the mixed anhydrides and the methyl substituents are in either of the 3'- and 4'-positions. The mixture of anhydrides obtained, hereinafter defined as "Compounds E and F," respectively, are acetic (4-methylbenzophenone 3,3',4'-tricarboxylic anhydride) anhydride and acetic (3-methylbenzophenone 4,3',4'-tricarboxylic anyhdride) anhydride. The latter compounds can be recovered from the reaction mixture by evaporation of the excess acetic anhydride at about 70° C. and 100 mm. of mercury absolute pressure.

The desired dimeric benzophenonetricarboxylic trianhydrides are obtained by merely heating Compounds E and F at a temperature of about 150° to about 220° C. and a pressure of about one to about 760 mm. of mercury absolute for about 0.5 to about 10 hours. The reaction is as follows:

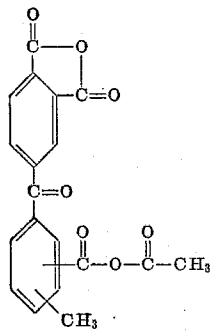
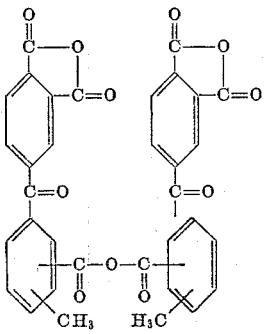

The mixture of dimeric benzophenonetricarboxylic trianhydrides obtained, hereinafter defined as "Compounds G, H and I," respectively, are bis(4-methylbenzophenone 3,3',4'-tricarboxylic anhydride) anhydride, bis(3-methylbenzophenone 4,3',4'-tricarboxylic anhydride) anhydride and 4-methylbenzophenone 3,3',4'-tricarboxylic anhydride, 3-methylbenzophenone 4,3',4'-tricarboxylic anhydride. It will be noted that in the production of Compounds G, H, and I the acetic anhydride previously employed is recovered and can be reemployed if desired. Compounds G. H and I can be recovered from the reaction mixture by recrystallization from a suitable solvent, such as ethyl acetate.

The invention can further be understood from the following:

Example I

Into a flask there was added 59 grams of 3,4,3',4'-tetramethylbenzophenone, 25 grams of acetic acid and 25 grams of water sufficient to form a slurry. An oxidation mixture was prepared by combining 193 grams of acetic acid, 193 grams of water, 150 grams of chromium trioxide and 177 grams of sulfuric acid. The oxidation mixture was added to the slurry dropwise and the resulting mixture was heated at a temperature of 80° C. and a pressure of 0 pound per square inch gauge over a period of seven hours. The mixture was additionally refluxed at a temperature of 105° C. and a pressure of 0 pound per square inch gauge for an additional hour. The reaction mixture was cooled to room temperature, diluted with 200 milliliters of water and then filtered. The solid left behind was extracted with 200 milliliters of a five percent aqueous solution of sodium hydroxide, as a result of which unoxidized charge was left behind and the sodium salts of the mono-, di- and tri-acids of the charge were taken into solution. The solution was treated with 35 grams of 37 percent hydrochloric acid and the organic acids precipitated out of solution, were filtered, washed and dried. The product obtained was a mixture of the mono-, di- and tri-acids of 3,4,3',4'-tetramethylbenzophenone. This product was extracted twice with 200 grams of water at about 95° C. The extract was heated at a temperature of 110° C. in a vacuum oven at 100 mm. mercury absolute pressure to remove water therefrom and a mixture of tri-acids, defined as "Compounds A and B" above, was obtained. The mono- and di-acids recovered were oxidized and worked up as before. Altogether 0.9 gram of the defined tri-acids were obtained. The neutral equivalent of the mixture of tri-acids obtained was found to be 109.6. The theoretical neutral equivalent is 109.3. Infrared spectrum shows the presence of carboxylic acid bonds.

Example II

A sample of 2.7 grams of the mixture of tri-acids defined above in Example I was heated for four hours at a temperature of 190° C. in a vacuum oven at a pressure of 100 millimeters of mercury absolute. The product was cooled, stored in a desiccator to prevent rehydration of the anhydride function and analyzed as a mixture of anhydrides defined as "Compounds C and D" above. 2.5 grams of this mixture was recovered. The neutral equivalent of the mixture of anhydrides obtained was found to be 104.0. The theoretical neutral equivalent is 103.3. Infrared spectrum shows the presence of both acid and anhydride bonds.

Example III

Two grams of the mixture of anhydrides obtained in Example II was refluxed with 15 milliliters of acetic anhydride at a temperature of about 140° C. and a pressure of about 0 pound per square inch gauge for two hours. The reaction product obtained was placed in a vacuum oven at 70°–75° C. and 100 millimeters mercury absolute pressure for 10 hours. The resulting product, about 2.0 grams, was a brown, amorphous solid composed of a mixture of Compounds E and F defined above. The neutral equivalent of the mixture of anhydrides obtained was found to be 86.0. The theoretical neutral equivalent is 88.0. Infrared spectrum shows no free carboxylic acid bonds but the presence of anhydride bonds.

Example IV

About 1.2 grams of the mixture obtained in Example III was placed in a vacuum oven and heated for two hours at 150° C. and 100 millimeters mercury absolute. The material obtained amounted to 1.0 gram of a mixture of Compounds G, H and I of a purity of 45.5 percent. The neutral equivalent of the mixture of trianhydrides obtained was found to be 93.6. The theoretical neutral equivalent is 100.3. Infrared spectrum shows the presence of anhydride bonds.

The new tri-acids disclosed and claimed herein, Compounds A and B, can be employed as intermediates in the preparation of the remaining new compounds, also disclosed and claimed herein, Compounds C, D, E, F, G, H and I. Since each of the latter compounds has at least one anhydride function, each can be employed as a curing agent for epoxy resins. The new dimeric benzophenonetricarboxylic trianhydrides, Compounds G, H and I, are extremely attractive for such purpose. The presence of two methyl substituents on the rings will tend to impart flexibility to the cured resin. Since there are only three anhydride functions for the four aromatic rings in Compounds G, H and I, which is a low density of anhydride functions per aromatic ring, these compounds will impart higher heat distortion values to the cured resin than an anhydride wherein there is a high ratio of anhydride functions per aromatic ring. In addition, the carbonyl functions in Compounds G, H and I are reactive and can provide a means for converting these compounds to other useful compounds. For example, hydrogenation of the carbonyl bridge can result in a carbinol bridge or a $CH_2$ bridge between the respective aromatic rings.

That the compounds produced herein containing anhydride functions can be employed to cure epoxy resins is seen from the following.

Example V

A mixture of the trianhydrides obtained above in Example IV (Compounds G, H and I) amounting to 0.139 gram and 0.35 gram of an epoxy resin (Shell Epon 828) was mixed in an aluminum weighing dish. A dark brown solution resulted when the mixture was heated to 200° C. The mixture was then cured at 200° C. for 24 hours, and the hardened resin was found to have a Barcol Hardness of 24.

Obviously, many modifications and variations of the invention, as hereinabove set forth, can be made without departing from the spirit and scope thereof, and therefore only such limitations should be imposed as are indicated in the appended claims.

We claim:
1. A process for preparing a mixture of benzophenone 4-methyl, 3,3',4'-tricarboxylic acid and benzophenone 3-methyl, 4,3',4'-tricarboxylic acid which comprises oxidizing 3,4,3',4'-tetramethylbenzophenone in the presence of chromium trioxide at a temperature of about 50° to about 150° C. for about 0.1 to about 10 hours.

2. A process for preparing a mixture of benzophenone 4-methyl, 3,3',4'-tricarboxylic anhydride and benzophenone 3-methyl, 4,3',4'-tricarboxylic anhydride which comprises oxidizing 3,4,3',4'-tetramethylbenzophenone with chromium trioxide to obtain a mixture of benzophenone 4-methyl, 3,3',4'-tricarboxylic acid and benzophenone 3-methyl, 4,3',4'-tricarboxylic acid and thereafter heating the latter at a temperature of about 150° to about 250° C. for about 0.5 to about 24 hours to obtain said mixture of benzophenone 4-methyl, 3,3',4'-tricarboxylic anhydride and benzophenone 3-methyl, 4,3',4'-tricarboxylic anhydride.

3. A process for preparing a mixture of acetic (4-methylbenzophenone 3,3',4'-tricarboxylic anyhdride) anhydride and acetic (3-methylbenzophenone 4,3',4'-tricarboxylic anhydride) anhydride which comprises oxidizing 3,4,3',4'-tetramethylbenzophenone with chromium trioxide to obtain a mixture of benzophenone 4-methyl, 3,3',4'-tricarboxylic acid and benzophenone 3-methyl, 4,3',4'-tricarboxylic acid, heating the latter at a temperature of 150° to about 250° C. for about 0.5 to about 24 hours to obtain a mixture of benzophenone 4-methyl, 3,3',4'-tricarboxylic anhydride and benzophenone 3-methyl, 4,3',4'-tricarboxylic anhydride and thereafter reacting said mixture of benzophenone 4-methyl, 3,3',4'-tricarboxylic anhydride and benzophenone 3-methyl, 4,3',4'-tricarboxylic anhydride with acetic anhydride to obtain said mixture of acetic (4-methylbenzophenone 3,3',4'-tricarboxylic anhydride) anhydride and acetic (3-methylbenzophenone 4,3',4'-tricarboxylic anhydride) anhydride.

4. A process for preparing a mixture of bis (4-methylbenzophenone 3,3'-4'-tricarboxylic anhydride) anhydride, bis (3-methylbenzophenone 4,3',4'-tricarboxylic anhydride) anhydride, and 4-methylbenzophenone 3,3'4'-tricarboxylic anhydride, 3-methylbenzophenone 4,3',4'-tricarboxylic anhydride anhydride which comprises oxidizing 3,4,3',4'-tetramethylbenzophenone with chromium trioxide to obtain a mixture of benzophenone 4-methyl, 3,3',4'-tricarboxylic acid and benzophenone 3-methyl, 4,3',4'-tricarboxylic acid, heating the latter at a temperature of about 150° to about 250° C. for about 0.5 to about 24 hours to obtain a mixture of benzophenone 4-methyl, 3,3',4'-tricarboxylic anhydride and benzophenone 3-methyl, 4,3',4'-tricarboxylic anhydride, reacting said mixture of benzophenone 4-methyl, 3,3',4'-tricarboxylic anhydride and benzophenone 3-methyl, 4,3',4'-tricarboxylic anhydride with acetic anhydride to obtain a mixture of acetic (4-methylbenzophenone 3,3',4'-tricarboxylic anhydride) anhydride and acetic (3-methylbenzophenone 4,3',4'-tricarboxylic anhydride) anhydride and thereafter heating said mixture of acetic (4-methylbenzophenone 3,3',4'-tricarboxylic anhydride) anhydride and acetic (3-methylbenzophenone 4,3';4'-tricarboxylic anhydride) anhydride to obtain said mixture of bis (4-methylbenzophenone 3,3',4'-tricarboxylic anhydride) anhydride, bis (3-methylbenzophenone 4,3',4'-tricarboxylic anhydride) anhydride, and 4-methylbenzophenone 3,3',4'-tricarboxylic anhydride, 3-methylbenzophenone 4,3',4'-tricarboxylic anhydride anhydride.

5. An anhydride of the structural formula:

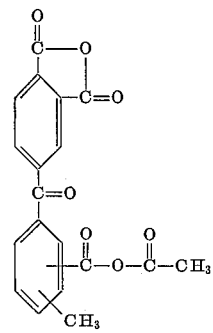

wherein the methyl substituent and the substituent adjacent thereto are located in the 3' and 4' position relative to the carbonyl bridge.

6. An anhydride of the structural formula:

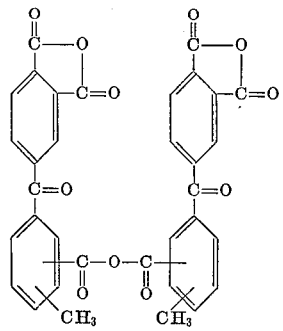

wherein in each of the rings wherein the same appear the methyl substituent and the substituent adjacent thereto are located in the 3' and 4' position relative to the carbonyl bridge.

References Cited by the Examiner
Clar: Berichte, 75 B (1942) pp. 1283–86.

NICHOLAS S. RIZZO, Primary Examiner.
HENRY R. JILES, Assistant Examiner.